July 19, 1960

E. RITZI 2,945,349

MINIATURE GAS TURBINE

Filed Nov. 12, 1957

INVENTOR.
EMIL RITZI,
BY
Harold J. Downes
ATTORNEY

July 19, 1960

E. RITZI 2,945,349

MINIATURE GAS TURBINE

Filed Nov. 12, 1957

INVENTOR.
EMIL RITZI,
BY Harold J. Downes
ATTORNEY

July 19, 1960    E. RITZI    2,945,349
MINIATURE GAS TURBINE
Filed Nov. 12, 1957    3 Sheets-Sheet 3
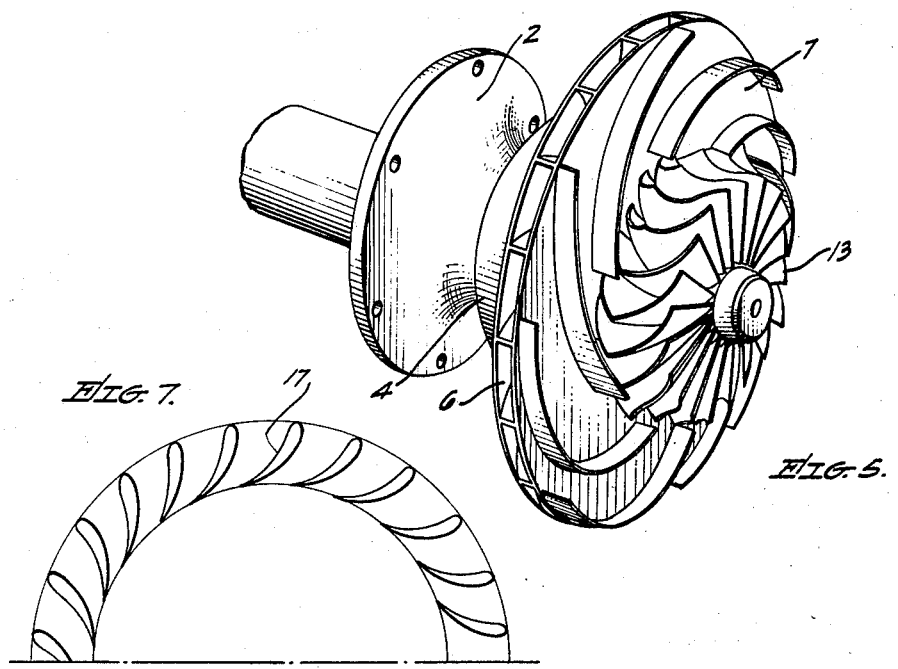
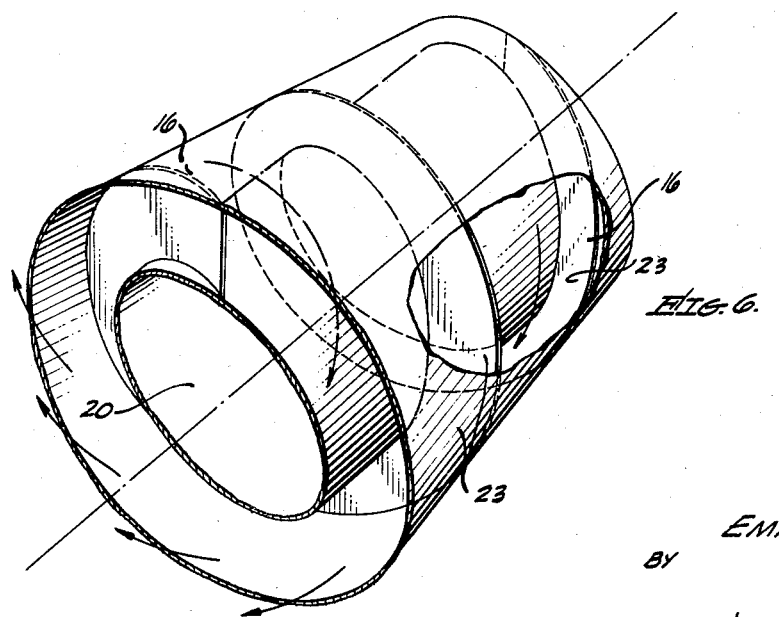
INVENTOR.
EMIL RITZI,
BY
Harold J. Downes
ATTORNEY ns
2,945,349
MINIATURE GAS TURBINE Emil Ritzi, Manhattan Beach, Calif., assignor to Lear, Incorporated Filed Nov. 12, 1957, Ser. No. 695,781

6 Claims. (Cl. 60—39.36)

This invention relates to gas turbines, and particularly to an air-breathing gas turbine adapted to produce shaft power of the order of 10 H.P. with efficiency comparable to that achieved in larger machines.

In contrast to an internal combustion engine, a gas turbine is a continuous-flow machine. A compressor must be provided which receives air at atmospheric pressure and compresses it to the pressure of and furnishes it to a combustion chamber. In the combustion chamber, hot gases are produced and the increased volume of gases due to the combustion processes is used to drive a turbine which, in turn, in some manner or another must drive the compressor which feeds the combustion chamber. While at first glance it appears there is no lower limit to which the scale of a gas turbine could be reduced, many problems begin to appear when an attempt is made to achieve low horsepower from a continuous flow machine.

One of the chief problems stems from the increasing effect of viscous shear stresses in the fluid in comparison to normal pressure forces when flow channels become narrower and narrower. For example, in the extreme case of purely laminar flow, the viscous shear stresses increase inversely with the linear dimension of the wheels while equal flow velocities and the same fluid properties are being maintained. This means that the relative flow losses (in comparison to energy available) also vary inversely under these conditions, with machine size.

The actual conditions, let us say in wheel sizes of 3" diameter, are not quite as severe as far as fluid friction is concerned, since flow in these wheel sizes appears to be still turbulent. However, on the other hand strict geometric similarity is in practice not possible because blade clearances cannot be scaled down proportionately with size; further, relative surface roughness cannot be kept constant and, likewise, the tip blade thicknesses on the turbine side have to be made proportionately thicker, which means higher blade and wheel stresses for the same wheel tip speed.

A further practical difficulty in small turbine engines is presented by the high rotative engine speed which for normal uses of shaft power has to be reduced in a gearbox, which tends to become comparable in weight to the actual engine and thereby significantly offsets the weight advantages of the gas turbine in comparison to the piston engine.

On the other hand, these difficulties are relieved in the small engine because of low engine weight per unit air flow and, likewise, low wheel mass moment of inertia per unit torque. Still, since not only specific fuel consumption but also net output of a given engine size and weight is substantially influenced by the efficiency of the compression and expansion device, the attainment of high component efficiencies is of prime importance in a miniaturized thermal engine.

This invention contemplates a gas turbine power plant having two principal rotating elements, the first of which operates with gases at relatively high temperatures but which is specially cooled in a manner hereinafter to be described, and a second of which rotates at a much higher rotative rate but at substantially lower material temperature than is the case with designs heretofore utilized.

Briefly explained, the power plant consists of a split or dual compressor and a split or dual turbine, both of the radial or mixed flow type, which are arranged back-to-back in two rotating assemblies turning in the same direction of rotation. The first rotating element comprises a rotating diffuser, power turbine arrangement directly connected with the output shaft, wherein the rotating diffuser (for air being compressed) is disposed in back-to-back arrangement with the power turbine to effect maximum cooling of the power turbine; and the second element is a miniature turbine driven by gases exhausted from the power turbine and driving a compressor impeller feeding the rotating diffuser of the first element, the second element being rotated at a speed roughly four times that of the power turbine. Between the rotating diffuser and the power turbine, of course, are disposed a fixed diffuser, the combustion chamber, and nozzles for directing the hot combustion chamber gases against the blades of the power turbine.

In this fashion, it is possible on the compressor side to obtain equal or higher work input per stage, compared to a single solid impeller, for much reduced tip speeds (especially at the rotating diffuser portion), which factor not only reduces stresses and the resulting relative speed, but increases substantially the degree of reaction of the compressor, that is, the pressure recovery of the compressor stage is then mostly obtained in the rotating impellers, where the conversion of velocity energy into pressure is effected with higher efficiency than in stationary diffusers.

A further improvement of compressor performance is made possible by the arrangement of an additional blade row ahead of the main high speed impeller which serves as an inducer producing a pre-swirl in direction of rotation and consequently a lower inlet Mach number at the main impeller. At the same time, this inducer blading serves as a structural member to support the low speed compressor and turbine blade assembly by a shroud from the cold side of the engine.

On the turbine side, in a similar manner as in the compressor, the tip speeds of both wheel portions can be lowered substantially in comparison to a single solid turbine wheel while maintaining the capability of the stage to handle efficiently the same head or produce the same power per unit weight-flow.

With proper choice of the tip speeds of the two concentric wheel parts, the dual turbine can be made to have a larger degree of reaction than a simple solid wheel. This means that the velocities leaving the stationary nozzle are relatively lower, which again results in better turbine efficiencies.

When compressor and turbine are combined back-to-back in the fashion indicated previously, it is possible to subject the lowest stressed parts to the highest temperature (nozzle—large wheel—small wheel) and thereby relieve the gas generator turbine as much as possible. The temperature difference from inlet to outlet is enlarged (beyond the amount resulting from expansion) by the mixing of cooling air entering the gas stream at the inlet of the power turbine and at the periphery of the small gas generator turbine through clearances from the compressor side. This scheme permits, therefore, the use of unusually high nozzle temperatures.

It will also be noticed that the sealing of hot gases is achieved without intricate seals by the compressed air of the compressor side.

A further advantage of the back-to-back arrangement is the substantial reduction of significant disc friction losses otherwise occurring at the back of compressor and turbine.

Another region where efficiency improvements over those of conventional design are possible is the combustion chamber. The attainment of minimum pressure losses in the burner of a small engine is of prime importance. The relatively large diameter of the radial-flow turbine with coaxial wheels provides for enough cross-sectional burner area to minimize losses.

An annular burner gives the best space utilization. In fact, it is possible to reduce the velocities sufficiently to obtain a laminar flame, similar to that in Bunsen burners and welding torches. Such a flame is relatively quiet and can be stabilized by merely keeping the boundary velocity gradient within the limits of blow-off and flash-back.

A conically widening annulus is provided to allow the flame to stabilize at different sections, depending on the amount of through-flow. Further advantage can be taken of the available space by folding the annulus, thereby doubling the burner length for the given engine length.

A homogeneous mixture is desirable for a laminar flame structure and over-all aerodynamic burner design. To keep the mixture within the limits of inflammability, a splitting of the flow into primary flow to form the mixture and a secondary flow to be by-passed and later to be mixed with the burned gases is then necessary. The primary flow volume is about ⅛ of the total. Because of this small volume, it is possible to collect it easily in a scroll, mix it with fuel and discharge the mixture into the conically enlarging annulus where the flame is forming. The swirl-producing scroll also makes possible uniform temperature distribution in the annulus with the use of only one injection nozzle.

The use of a single fuel nozzle is dictated by the small fuel flow which makes impractical the use of several high pressure nozzles, because of the resulting diminutive size of the orifices.

It is seen that, in general, the design principles followed for the attainment of high aerodynamic efficiency are:

(a) Where high velocities are necessary for the efficient conversion of energy, they should occur with a minimum of wetted area; where high velocities are not necessary for energy conversion, ample flow passages should be provided. Therefore, the small high-speed gas generator rotor is arranged in a relatively large casing.

(b) Absolute velocities should be kept as low as possible in stationary parts, and where they have to be necessarily high, the flow should be guided in rotating channels turning in the same direction as the swirling fluid.

It is therefore an object of this invention to provide an improved low horsepower gas turbine.

It is another object of this invention to provide a gas turbine having two separate rotative elements rotating at differing speeds and having differing temperature and stress requirements.

It is another object of this invention to provide an arrangement of turbine and compressor elements designed to extract the optimum performance from materials having predetermined limiting properties.

It is another object of this invention to provide a novel means for mixing and burning fuel in a small gas turbine.

It is another object of this invention to provide a gas turbine which has a high aerodynamic efficiency at part load as well as at full design load.

Other objects of invention will become apparent from the following description taken in connection with the accompanying drawings, in which Fig. 1 is an elevational view of the invention, partly in section;

Fig. 5 is a perspective view, showing the rotating parts of the invention;

Fig. 6 is a view of the scroll and fuel vaporizing chamber of the invention;

Figure 2:
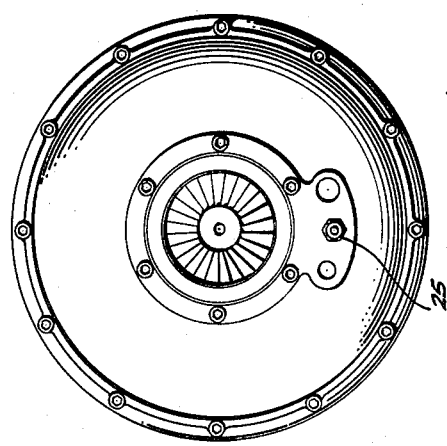
Fig. 2 is an end view of the invention.
Figure 1:
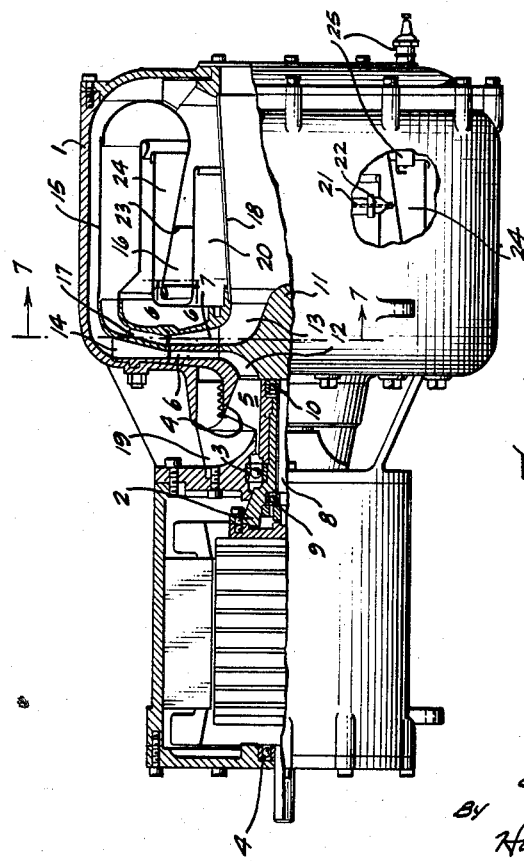

And Fig. 7 is a sectional view of the device shown in Fig. 1, taken at 7—7 in Fig. 1.

Referring now to the drawings, and in particular to Fig. 1, the turbine is comprised of a casing 1 which encloses the operating parts of the turbine. Turbine casing 1 supports main drive shaft 2 on bearing 3 at one end and on bearing 4 at the other end. The leftmost portion of casing 1 in Fig. 1 may typically be used to house a generator or other equipment to be driven by the turbine, or an exterior bearing other than bearing 3 must be provided in order that shaft 2 may be supported at at least two points. Shaft 2 supports integral main power wheel 4 which includes inducer blades 5, rotating diffuser 6, and power turbine blades 7. Supported within shaft 2 is a second shaft 8 supported upon bearings 9 and 10 and integrally attached to inner element 11 having compressor blades 12 and turbine blades 13. Supported on the interior of casing 1 are fixed diffuser blades 14, annular mixing chamber 15, combustion chamber 16, and nozzle vanes 17. Annular exhaust cone 18 completes the enclosure of the combustion chamber and associated fixed parts.

Figure 3:
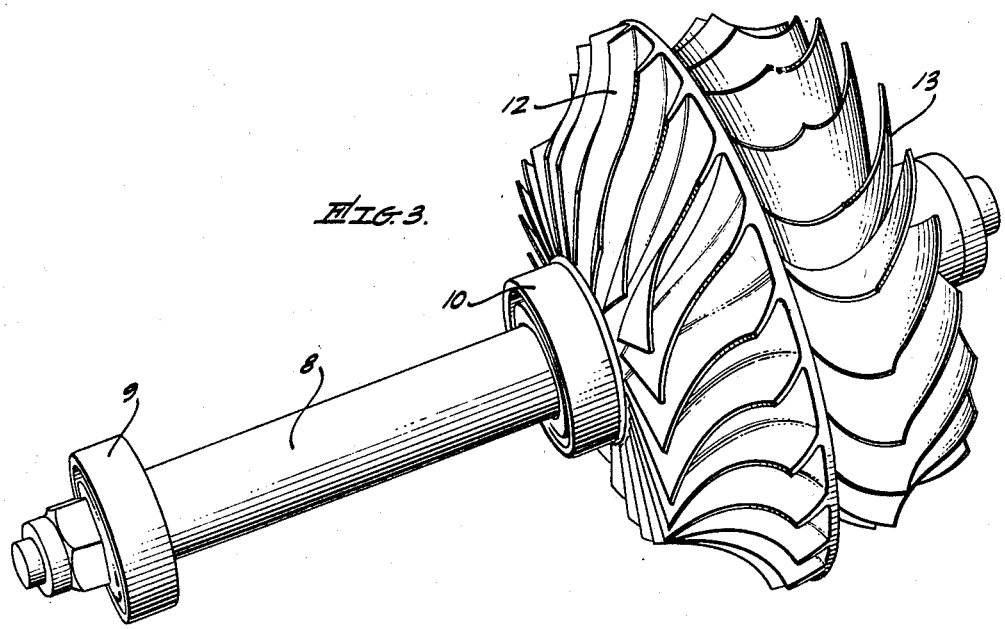
Fig. 3 is a perspective view of the inner rotor of the invention.
Figure 4:
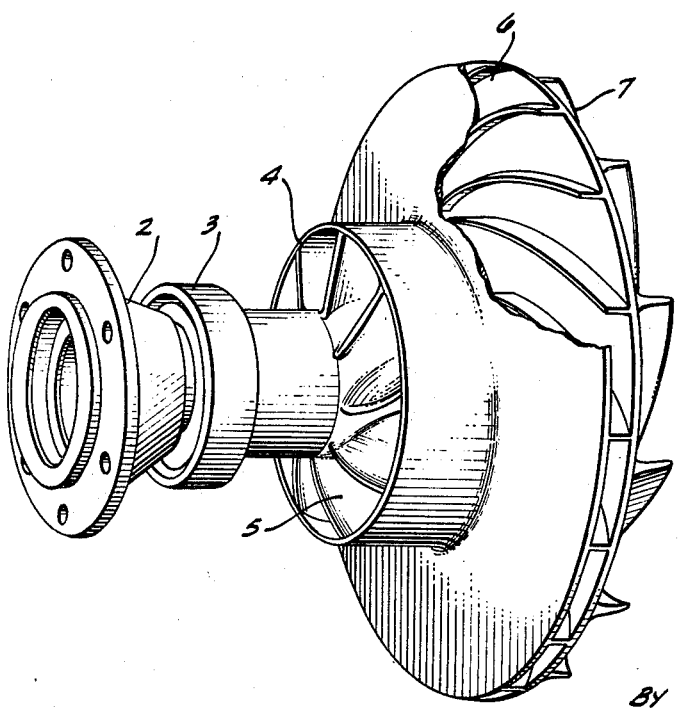
Fig. 4 is a perspective view, partly cut away, of the rotating diffuser-power compressor element of the invention.

The shape and relation of the various blades, nozzles and vanes referred to are shown in the perspective views of Figs. 3, 4 and 5.

In operation, air at atmospheric pressure is drawn in through throat section 19 and enters inducer blades 5, whence it is fed to compressor blades 12 which are rotated at high speed by means hereafter to be explained. After leaving the compressor formed by blades 12, the air enters rotating diffuser 6 which is a part of the large rotating element 4 which rotates at a speed which is approximately ¼ of the rotative speed of element 11 to which blades 12 are attached. As shown in Fig. 4, the blades 6 of the rotating diffuser diverge greatly so that the radial exit velocity of the air leaving diffuser blades 6 is greatly reduced from the exit velocity of compressor blades 12. This reduced velocity implies a substantial increase in pressure with, however, a pronounced rotative swirl and a substantial radial velocity as the air enters fixed diffuser vanes 14. Since these vanes also diverge radially, the velocity of the air is further slowed and the pressure increased so that by the time the air reaches the entrance to annular mixing chamber 15 it has achieved a pressure of several atmospheres. The air then proceeds in a direction indicated in Fig. 1 to direct contact with exhaust cone 18. At this point, a portion of the air is admitted to vaporizing chamber 16 where fuel under pressure is admitted through fuel conduit 21 and jet 22. The fuel-air mixture is then mixed thoroughly by passing through scroll 23, shown in Fig. 6, and passes to annular combustion chamber 24 where it is ignited by electrically heated ignition plug 25. The remainder of the air follows outer annulus 20 and serves to cool the exhaust cone. Meanwhile, this air is increased in temperature by contact with the exhaust cone and finally is mixed with hot gases proceeding from combustion chamber 24, as shown. The hot gases and the bypass air are thus mixed and fed to nozzles 17 shown in greater detail in Fig. 7. The use of scroll 23 assures uniform mixture of fuel and air as fed to the combustion chamber. It will be noted that the scroll is pitched in the direction of rotation of the engine. These nozzles serve to convert the pressure energy of the hot kinetic gases into kinetic energy and direct the hot exhaust gases against power turbine blades 7. Power turbine blades 7 are set at an angle such as shown in Fig. 5 to provide a rotative speed of approximately 24,000 r.p.m. Since these blades are part of a wheel of which rotating diffuser blades 6 are also a part, these power turbine blades are maintained at a temperature substantially lower than that of the gases which are used to drive them. It will also be noted from Fig. 5 that the blades converge somewhat at their inner end so that the exit velocity from these blades is still somewhat high, and the gases coming from these blades are directed against turbine blades 13 on inner element 11. These blades are shaped as shown in Figs. 3 and 5 so that the spent gases therefrom exit axially through exhaust cone 18. In other words, the turbine formed by blades 13 has a radial input and an axial output and the direction of flow of the gases is thus changed by 90°. Element 11, because of the blade angles chosen both for power turbine blades 7 and also for turbine blades 13, rotates at a speed of 90,000 r.p.m., or thereabouts, being roughly four times that of the power turbine. However, since the tips of blades 13 have a radius roughly half that of the tips of blades 7, the stresses to which they are subjected are not as great as might be presumed from the rotative speeds involved. Also, the combustion gases undergo a substantial cooling in the course of their doing work on blades 7, so that the blades 13 are not subject to as high a temperature as those of blades 7. Accordingly, blades 13 are capable of withstanding the combination of temperature and stress to which they are subjected.

It should be noted that the rotating diffuser comprising blades 6 attached to the larger wheel may be designed in two distinct possible ways. The first of these is that by which the rotating diffuser extracts work from the fluid, i.e., the compressed air. Depending upon the rotative speed and diameter ratios of the wheel and blading, backward bent blading is generally required to exercise this possibility. With this design, the blade outlet is directed against the direction of rotation. The considerable blade curvature necessary in such a design calls for a large number of blades thickened at the middle, which then preferably cover only a narrow ring at the outlet of the diffuser and leave the inlet portion vaneless. Thus, in Figs. 4 and 5, the blades 6 would be somewhat more numerous and reversed in curvature. With this arrangement, the large wheel actually is driven to some extent by the gases being diffused by the diffuser blading. Thus, work is done on the inlet air by the compressor section of the small wheel, and the air then does some work upon the diffuser blading of the large wheel. Under some conditions this arrangement may be desirable and is an alternative to the configuration shown in the drawings and described hereinbefore.

The second alternative, and that shown in detail in the drawings, is that the rotating diffuser acts as an additional compressor impeller with work addition to the fluid. Depending upon the speed and diameter ratio of the primary and secondary impellers, the blading of the second impeller, or rotating diffuser (blades 6), will tend to be forward bent in the direction of rotation, as shown in the figures. With this blade design, the blade curvature is very gentle and fewer blades are necessary. Also, the blades may extend from the inlet circle to the outlet circle of the rotating diffuser.

In this invention it is generally preferred to use the second alternative because it is desirable out of therodynamic reasons, though ordinarily difficult to obtain because of structural strength limitations, to achieve as large as possible a work input in compressor stage.

The effectiveness of the split design disclosed in this invention, applied both to compressor and turbine, is greatly affected by the diameter ratio of outlet to inlet circles of the outer element, wheel 4. A large such ratio on the compressor side is important for obtaining a large total work input per stage with low tip speeds and, likewise, on the turbine side, a large diameter ratio of the power turbine allows an increased work output of this turbine with moderate tip speeds.

Although the invention has been described and illustrated in detail, it is to be clearly understood that the same is by way of illustration and example only and is not to be taken by way of limitation, the spirit and scope of this invention being limited only by the terms of the appended claims.

I claim:

1. A gas turbine engine comprising an outer wheel having a flat central circular disc open at the center, structure incorporating radial diffuser means on one side of said disc, centripetal flow turbine blades on the other side of said disc, a first shaft, inducer blades supporting said disc on said shaft, an inner wheel fitting within the opening in said disc and having a central circular diaphragm, compressor blades on one side of said diaphragm and arranged to supply air to said diffuser means, turbine means on the other side of said diaphragm and receiving gases from the turbine blades on said outer wheel, a second shaft bearingly supported on said first shaft and supporting said diaphragm, fixed diffuser means located radially outward from said outer wheel and receiving air from said radial diffuser means, means receiving said air for producing hot combustion gases, nozzle means feeding said combustion gases to said centripetal flow turbine blades, and fixed casing means enclosing said wheels and bearingly supporting same.

2. In a gas turbine engine, an outer annular disc wheel having radially disposed turbine blades arranged on one side thereof to receive hot gases at their periphery and discharge them at their inner extremity, a hollow shaft supporting said wheel, an inner wheel having turbine blades shaped to receive exhaust gases from said radially disposed turbine blades, a shaft supporting said inner wheel, bearings supported in said hollow shaft bearingly supporting said inner wheel shaft, input air inducer blading connecting said outer annular disc wheel and said hollow shaft and providing the only structural connection therebetween, a compressor driven by said inner wheel and receiving air from said inducer blading, and rotating diffuser means attached to said annular disc wheel and receiving air from said compressor.

3. In a gas turbine engine, an outer annular disc wheel having radially disposed turbine blades arranged on one side thereof to receive hot gases at their periphery and discharge them at their inner extremity, a hollow shaft supporting said wheel, an inner wheel having turbine blades shaped to receive exhaust gases from said radially disposed turbine blades, a shaft supporting said inner wheel, bearings supported in said hollow shaft bearingly supporting said inner wheel shaft, input air inducer blading connecting said outer annular disc wheel and said hollow shaft and providing structural support therebetween, and generally radially diverging blading attached to the other side of said annular disc wheel for at least partially diffusing air received at their inner extremity, and compressor blading on said inner wheel receiving air from said inducer blading and furnishing it to said partial diffusing blading.

4. In a gas turbine engine, a generally cylindrical casing; an outer wheel comprising a flat, circular disc having a central circular opening; a second flat circular disc having a cylindrically flanged central opening; a plurality of generally radial, curved blades disposed between said discs and joining them together with said flanged portion extending away from said first disc; a plurality of generally radially-directed curved blades on the open side of said first disc; a hollow shaft bearingly supported on said casing; a plurality of radially-directed inducer blades connecting said shaft to the flanged portion of said second disc, said inducer blades being skewed with respect to the axis of said shaft; an inner wheel fitting within the opening in said outer wheel and bearingly supported on said hollow shaft and having a central circular diaphragm; axial input-radial output compressor blading on one side of said diaphragm arranged to receive air from said inducer blading and furnish it to the space between said discs of said outer wheel; radial input-axial output turbine blading on the other side of said diaphragm arranged to receive effluent gas flow from the inner extremity of the blades on the open side of said first disc of said outer wheel and to rotate in the same direction as said outer wheel; and burner means within said casing receiving air from the periphery of the space between the disc of said outer wheel and furnishing combustion gases under pressure and at high velocity in a generally radially inward direction to said blades on the open side of said first disc on said outer wheel.

5. A device as recited in claim 4 and further comprising fixed diffuser means receiving air from the periphery of the space between said discs of said outer wheel and furnishing it to said burner means, and nozzle means directing combustion gases from said burner means centripetally against the blading on the open side of said first disc of said outer wheel.

6. A device as recited in claim 5 in which said burner means comprises an annular mixing chamber the inside surface of which is exposed to exhaust gases of said turbine, a spiral scroll in said chamber providing a circumferential swirl to gases flowing therethrough, means spraying liquid fuel into said chamber, a conically-annular combustion chamber diverging in the direction of flow therethrough receiving air and fuel mixture from said mixing chamber, and combustion initiating means in said combustion chamber.

References Cited in the file of this patent

UNITED STATES PATENTS

| 2,646,664 | Meschino | July 28, 1953 |
| 2,775,238 | Clark et al. | Dec. 25, 1956 |

FOREIGN PATENTS

| 724,176 | Great Britain | Feb. 16, 1955 |
| 765,914 | Great Britain | Jan. 16, 1957 |

OTHER REFERENCES

Engineering, vol. 181, No. 4707, May 25, 1956 (pages 405-406).